Patented Apr. 11, 1950

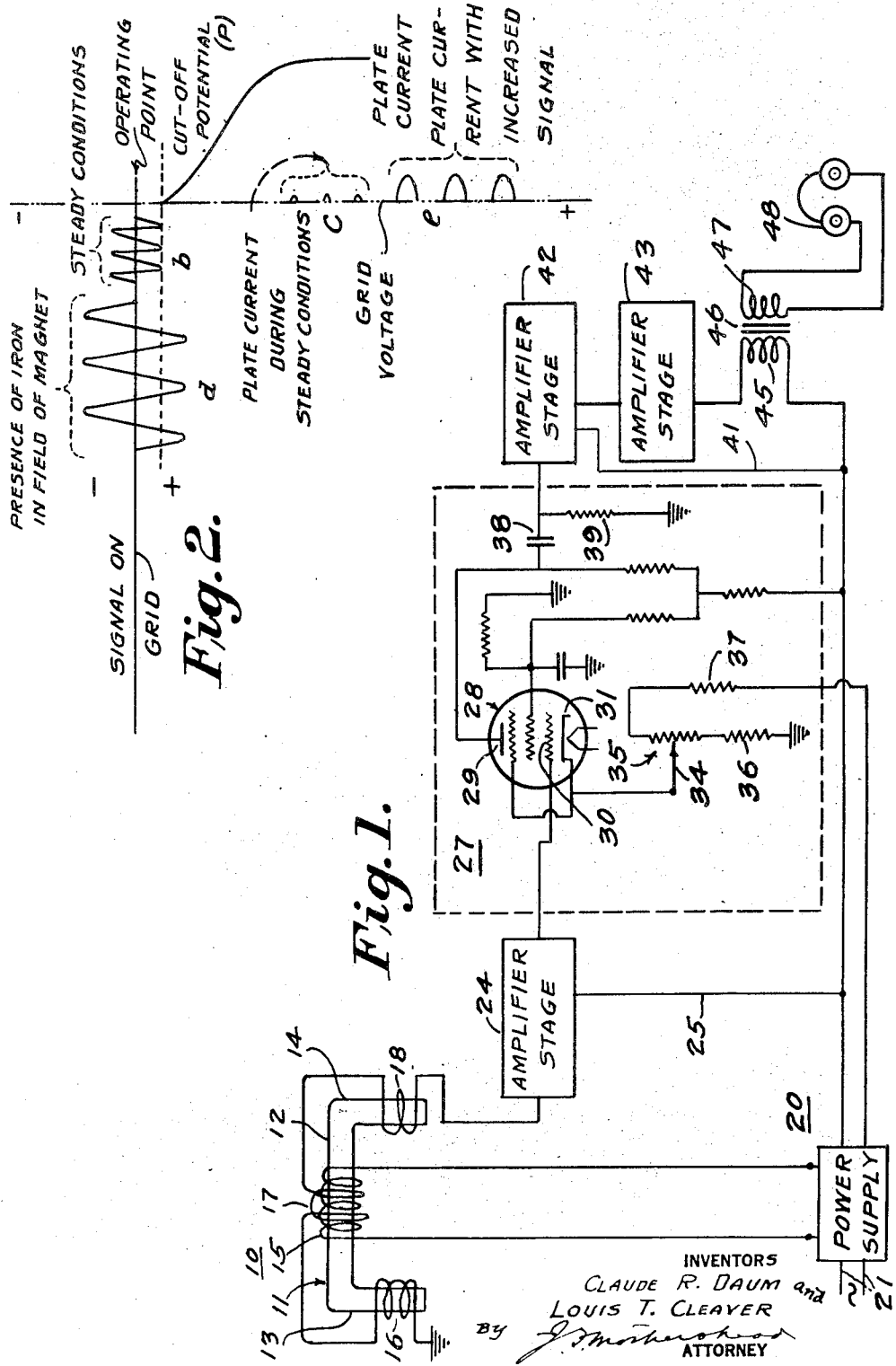

2,503,247

UNITED STATES PATENT OFFICE 2,503,247

ELECTRONIC DETECTOR

Claude R. Daum and Louis Thomas Cleaver, Denver, Colo., assignors to the United States of America as represented by the Secretary of the Interior Application October 14, 1946, Serial No. 703,110

2 Claims. (Cl. 175—183)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to an electronic metal detector, and more particularly, to an electronic detector for locating reinforcing bars embedded in concrete.

It is frequently desirable to know the exact location of reinforcing bars embedded in concrete. Although the plan of the reinforcing is available there is no assurance that the plan was accurately followed or that the reinforcing bars did not slip from their intended position as the concrete was poured.

Knowledge of the exact location of the reinforcing bars in the concrete allows a check of the accuracy with which the plans were followed and also allows an accurate calculation of the strength of the finished structure.

When it is necessary to drill holes, such as grout holes, in reinforced concrete, if the drill encounters a steel reinforcing bar, the drill may be damaged. If the drill cuts through a reinforcing bar, a substantial decrease in design or original strength may result.

It is frequently desirable to locate reinforcing bars during the progress of a construction job and therefore in the midst of a high noise level caused by such tools as pneumatic drills. If an electronic instrument is used and this instrument employs audible indication, it is necessary that the audible indication be a highly distinctive one readily picked out from external noises and the fortuitous, spurious noises inevitably produced by an electronic circuit.

One object of this invention is to provide a means for detecting and locating a hidden mass of metal.

Another object of this invention is to provide a means for accurately locating a metal reinforcing bar embedded in concrete.

A further object of this invention is to provide a distinctive audible indication for a metal locating device.

Other objects of this invention will be apparent from the specification taken in connection with the accompanying drawing, in which:

Fig. 1 is a schematic diagram of the electronic metal detector; and

Fig. 2 shows a group of curves explaining the operation of one feature of the invention.

Referring now more particularly to Fig. 1, a probe 10 comprises a U-shaped iron core 11, preferably laminated, having a central portion 12 and leg portions 13 and 14. Probe 10 also includes an input coil 15 wound about the center portion 12 of the core 11, output coils 16 and 18, each wound on one of the legs 13 and 14 of the core 11, and compensating coil 17 wound over coil 15 on the central portion 12 of the core 11.

Power supply 20 connected to a source of alternating potential through leads 21 causes an alternating current to flow in input coil 15. Output coils 16 and 18 and compensating coil 17 are connected so that the voltage induced in coils 16 and 18 adds each to the other while the voltage induced in compensating coil 17 subtracts from the voltage induced in coils 16 and 18. The combined voltage produced by coils 16, 17 and 18 is supplied to the input of amplifier stage 24 which is connected through lead 25 to a source of positive potential in power supply 20. Amplifier stage 24 is a conventional electronic amplifier the construction and operation of which is well known to those skilled in the art.

The output of amplifier stage 24 is connected to control grid 30 of vacuum tube 28 in amplifier stage 27. Vacuum tube 28 also includes an anode 29 and cathode 31. Cathode 31 is connected through sliding contactor 34 to potentiometer 35. Potentiometer 35 is connected through resistor 36 to ground and through resistor 37 to a suitable potential in power supply 20 to provide an adjustable bias for cathode 31 so that grid 30 is negatively biased with respect to cathode 31 and a selected threshold value may be imposed upon the plate current flowing through tube 28. The other elements in amplifier stage 27 are conventional and well known to those skilled in the art. The output of vacuum tube 28 is resistance-capacitor coupled by means of capacitor 38 and resistor 39 to the input of amplifier stage 42 which may be of similar construction to that of amplifier stage 24. Amplifier 42 is also connected by conductor 41 to a source of positive potential in power supply 20.

The output of amplifier stage 42 is connected to the input of amplifier stage 43. Amplifier stage 43 is constructed in accordance with known principles to provide a suitable output to the primary 45 of matching transformer 46. The other terminal of primary 45 is connected to the source of positive potential in power supply 20. The secondary 47 of transformer 46 is connected to headphones 48. It is obvious that in place of the headphones 48 giving an audible indication, a visual indicator such as a meter or a cathode ray tube could be used.

In operation, power supply 20 causes an alternating current to flow in input coil 15 of probe 10 which in turn causes an alternating flux to flow in core 11. This alternating flux causes voltages to be induced in output coils 16 and 18 and compensating coil 17. Coils 16, 17 and 18 are so connected that the voltage induced in coils 16 and 18 adds to, while the voltage of 17 subtracts from, the combined output voltage supplied to the input of amplifier stage 24.

With no metal mass in the proximity of legs 13 and 14 of probe 10 a relatively small flux will be induced in core 12 by input coil 15 because of the large air gap between legs 13 and 14 and accordingly a relatively small output voltage will be produced by coils 16, 17 and 18. However, when a metal mass is in the proximity of legs 13 and 14, particularly a ferromagnetic bar reaching between the ends of legs 13 and 14, a relatively large output signal will be delivered to amplifier stage 24 by coils 16, 17 and 18.

The range of voltage delivered to the input of amplifier 24 may be readily controlled by the small compensating coil 17. Coil 17, the voltage of which opposes that of output coils 16 and 18, provides an easy means for keeping the combined output voltage delivered to amplifier 24 within the range handled by that amplifier. Coil 17 being wound over input coil 15 on the central portion 12 of probe 10 is affected by leakage flux not flowing through legs 13 and 14 of core 11 and therefore is in a region of relatively constant flux and does not appreciably impair the sensitivity gained by the use of relatively large output coils 16 and 18. This arrangement of the output coils and the compensating coils has proven most advantageous in practice. However, it will be obvious to those skilled in the art that the detecting device disclosed herein will operate satisfactorily with the compensating coil 17 omitted and with output coils 16 and 18 having a proper number of turns to keep their induced combined voltages within the range capacity of amplifier stage 24. Amplifier stage 24 serves to amplify the signal supplied to its input and pass the amplifier signal to amplifier stage 27.

Referring now more particularly to Fig. 2, curve A shows the plate current of tube 28 plotted against grid voltage. Curve B shows the input signal applied to the control grid 30 of tube 28 when no metallic mass is in proximity to the air gap between legs 13 and 14 of probe 10. Curve C shows the plate current flowing to plate 29 of vacuum tube 28 with the signal shown at curve B applied to grid 30. Curve D shows the signal applied to grid 30 of tube 28 when a metal mass is in proximity to the air gap of probe 10. Curve E shows the plate current produced by tube 28 under the conditions of curve D when metal is in proximity to the air gap. It is apparent from Fig. 2 that an increased output from output coils 16 and 18 produces in stage 27 not only pulses of greater magnitude but also of longer duration. The harmonics added to the signal by stage 27 make it easier for the ear to distinguish changes in indication since the change in both the quantity and quality of the audible signal. The signal produced by amplifier stage 27 is amplified in stages 42 and 43 and supplied through matching transformer 46 to head-phones 48 where a distinctive signal rich in harmonics is produced.

In use, after the electronic detector has warmed up and become stabilized, by sliding contactor 34 the negative bias applied between grid 30 and cathode 31 is adjusted so that when probe 10 is not in the proximity of an iron bar a low indicating hum is heard in the phones and the operation shown by Fig. 2 is achieved. Either by consulting the plans of the reinforcing bars or by rotating the probe about one of its legs the axis of the embedded reinforcing bars may be found. The probe is then moved along the concrete wall in a direction parallel to the axis of the reinforcing bars. A strong signal will be heard in the ear phones when the probe passes over an embedded reinforcing bar.

The invention described herein has proven particularly advantageous in practice allowing accurate checking of the location of the reinforcing bars embedded and completely hidden in a concrete structure and allowing the drilling of necessary holes without damage to the drill or the concrete structure. While this invention may be used with visual indication, it will be apparent that the preferred embodiment described herein is particularly advantageous in that it combines the simplicity of audible indication along with a distinctive indication distinguishable from other noises. In practice this invention has been used satisfactorily on construction jobs where the noise level was extremely high, differences in indication being distinguishable by changes in harmonics as well as in intensity.

What is claimed is:

1. In combination a probe having a U-shaped magnetic core with a center portion and two legs, an input coil wound about the center portion of said core, two output coils each wound about one of the legs of said core and near the ends thereof, a compensating coil wound about the center portion of said core and in substantial axial registry with said input coil, a power supply for causing an alternating current to flow through said input coil, said alternating current causing an alternating flux to flow in said core, said output coils and said compensating coil being so connected that the voltage induced in the output coils adds each to the other while the voltage induced in said compensating coil subtracts from that produced by the output coils to produce a combined output voltage, means connecting said combined output voltage to an amplifying means, said amplifying means including electrical discharge means having at least a cathode, anode and control electrodes, means for applying an input signal to said control electrode, means whereby a negative bias is applied to said control electrode with respect to said cathode so that only the positive peaks of said input signal applied to said control grid will cause a current to flow between said cathode and anode whereby a distinctive electrical signal having harmonics is produced, means capable of transforming said distinctive electrical signal into an audible signal of similar characteristics, means for applying said distinctive electrical signal to said means for producing an audible signal.

2. In combination a probe having a U-shaped magnetic core with a center portion and two legs, an input coil wrapped about the center portion of said core, a source of alternating current applied to said input coil to cause an alternating magnetic flux to flow in said core an output coil wound about each of the legs of said core and near the ends thereof, a compensating coil wrapped about the center portion of said core and in axial registry with said input coil, said output coils having a greater total number of turns than said compensating coil, said output coils and said compensating coil being so connected that the voltage induced in said output coils by said alternating flux adds each to the other and the voltage induced in said compensating coil by said alternating flux subtracts from the voltage induced in said output coils to produce a combined output voltage, means for applying said combined output voltage to an indicating means for indicating at least one of the characteristics of said combined output voltage.

CLAUDE R. DAUM.
LOUIS THOMAS CLEAVER.

REFERENCES CITED

The following references are of record in the file of this patent:

UNITED STATES PATENTS

| Number | Name | Date |
|---|---|---|
| 1,339,610 | Von Henke | May 11, 1920 |
| 2,033,654 | Selquist et al. | Mar. 10, 1936 |
| 2,228,294 | Wurzbach | Jan. 14, 1941 |
| 2,290,330 | Irwin | July 21, 1942 |
| 2,315,045 | Breitenstein | Mar. 30, 1943 |
| 2,321,355 | Berman | June 8, 1943 |
| 2,393,717 | Speaker | Jan. 29, 1946 |